Aug. 30, 1966     H. W. MARANO     3,269,083
LOADING APPARATUS

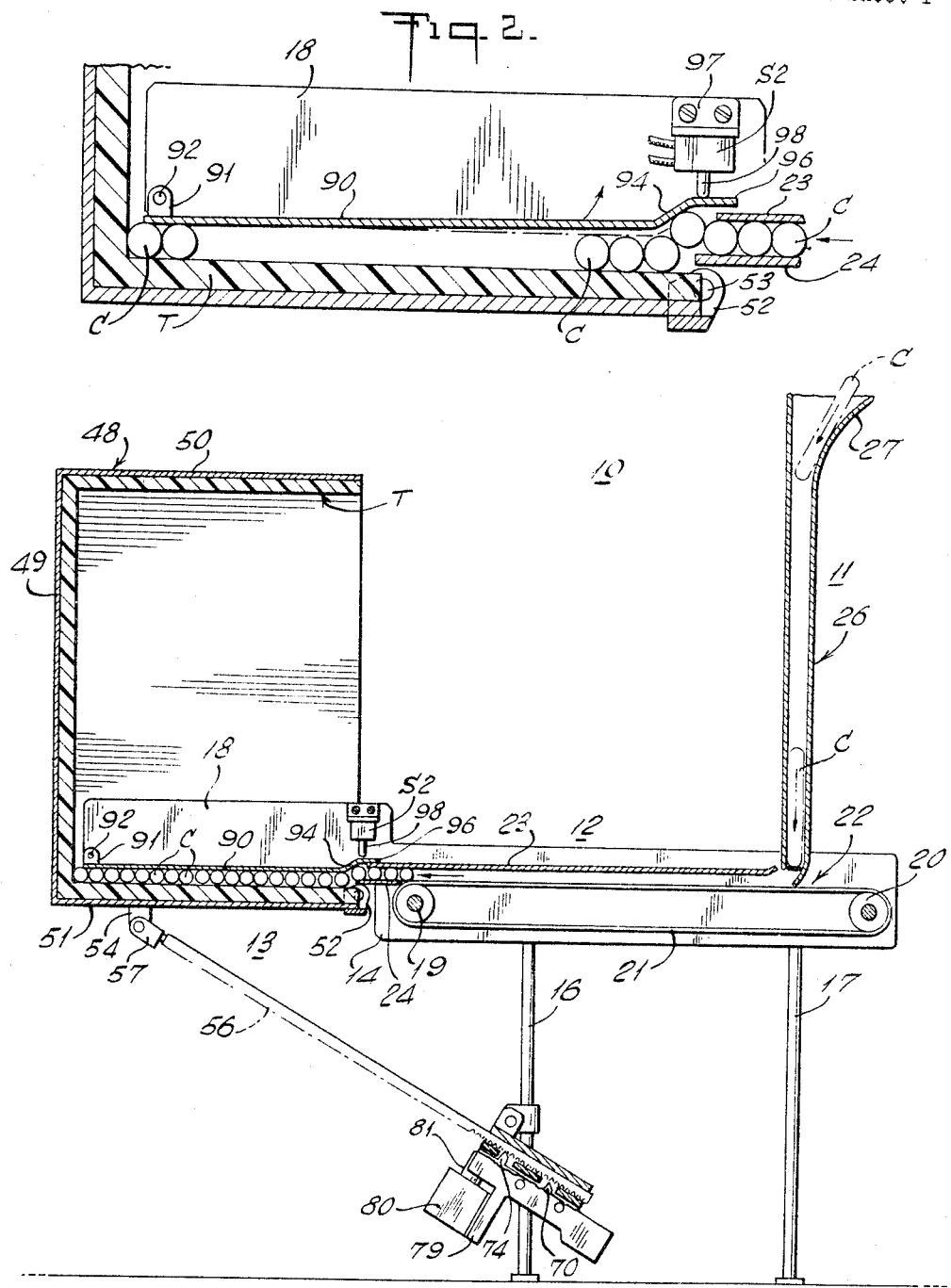

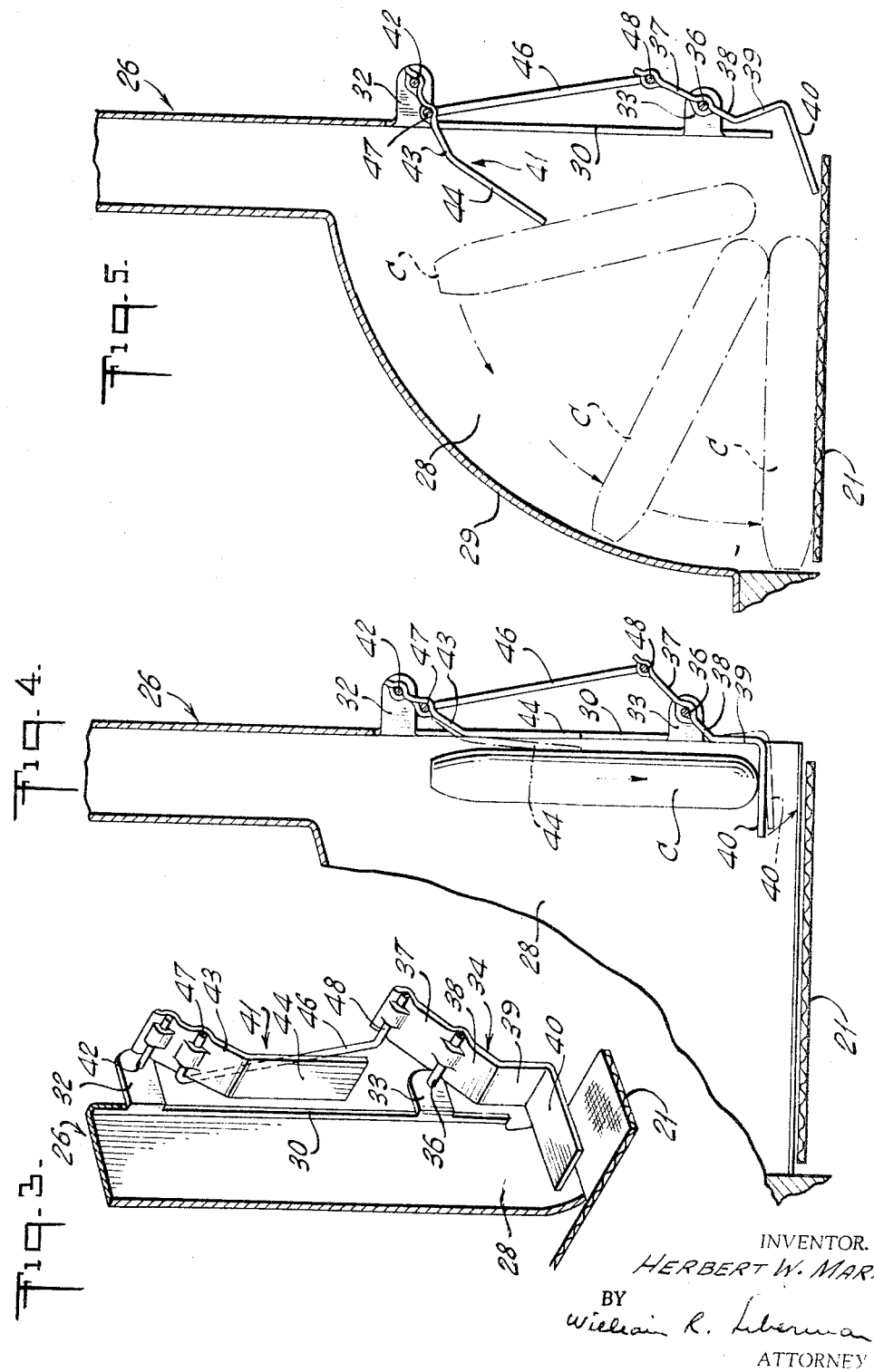

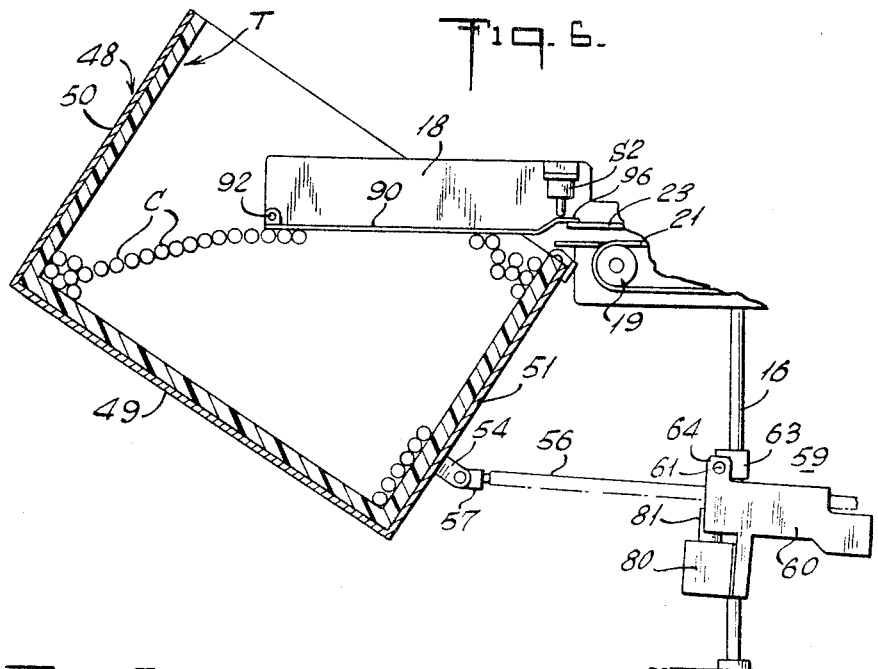
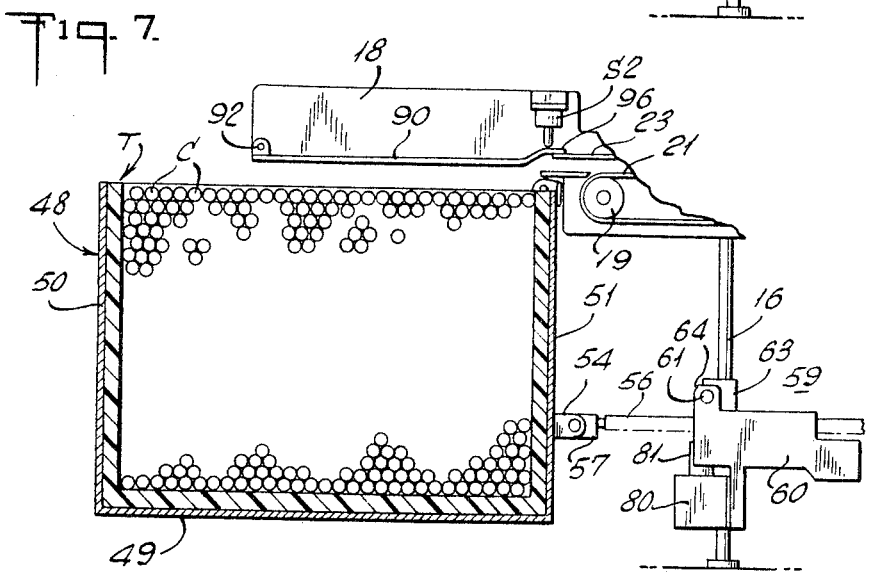

Filed July 23, 1963                                                                      4 Sheets-Sheet 4

INVENTOR.
HERBERT W. MARANO
BY
William R. Lieberman
ATTORNEY

United States Patent Office 3,269,083
Patented August 30, 1966

3,269,083
LOADING APPARATUS
Herbert W. Marano, Summit, N.J., assignor to Consolidated Cigar Corporation, New York, N.Y., a corporation of Delaware
Filed July 23, 1963, Ser. No. 297,029
5 Claims. (Cl. 53—64)

The present invention relates generally to improvements in article handling equipment and it relates particularly to an improved apparatus for the handling of cigars in an intermediate stage of the packaging or boxing process.

Many operations involved in the manufacture and packaging of cigars and similarly elongated rod-like articles require the loading of the cigars into containers known as tote boxes. These are generally open-topped rectangular receptacles lacking one side to afford ready accessibility to the contents of the box. Cigars are frequently delivered in random orientation lengthwise, and must be uniformly arranged extending in the one direction attendant loading into the tote box. This has heretofore involved laborious and time-consuming procedures, which increased the cost of the end product. Automatic equipment has been proposed for effecting the loading cigars into tote boxes but these have been complicated and expensive devices leaving much to be desired.

It is thus a principal object of the present invention to provide an improved article handling apparatus.

Another object of the persent invention is to provide an improved apparatus for automatically loading tote boxes with regularly oriented cigars.

A further object of the present invention is to provide an improved apparatus for reorienting cigars and regularly loading them into a tote box.

A still further object of the persent invention is to provide an improved apparatus of the above nature, characterized by its simplicity, ruggedness and reliability.

The above and other objects of the present invention will be apparent from or specifically pointed out in the following description taken in conjunction with the accompanying drawing wherein:

FIGURE 1 is a longitudinal vertical sectional view, partially fragmentary, of an apparatus embodying the present apparatus shown in an early loading stage;

FIGURE 2 is an enlarged fragmentary sectional view similar to FIGURE 1, showing the sensing component of the apparatus in a condition effecting the advance of the tote box;

FIGURE 3 is a perspective view of cigar orienting device in accordance with the present invention;

FIGURE 4 is a vertical fragmentary sectional view thereof illustrating a cigar immediately prior to the orienting thereof;

FIGURE 5 is a view similar to FIGURE 4 illustrating the orienting device at the termination of the orienting cycle;

FIGURE 6 is a fragmentary view similar to FIGURE 1 illustrating the tote box in a partially filled condition;

FIGURE 7 is a fragmentary view similar to FIGURE 1 illustrating the tote box in a completely filled condition;

Figure 8:
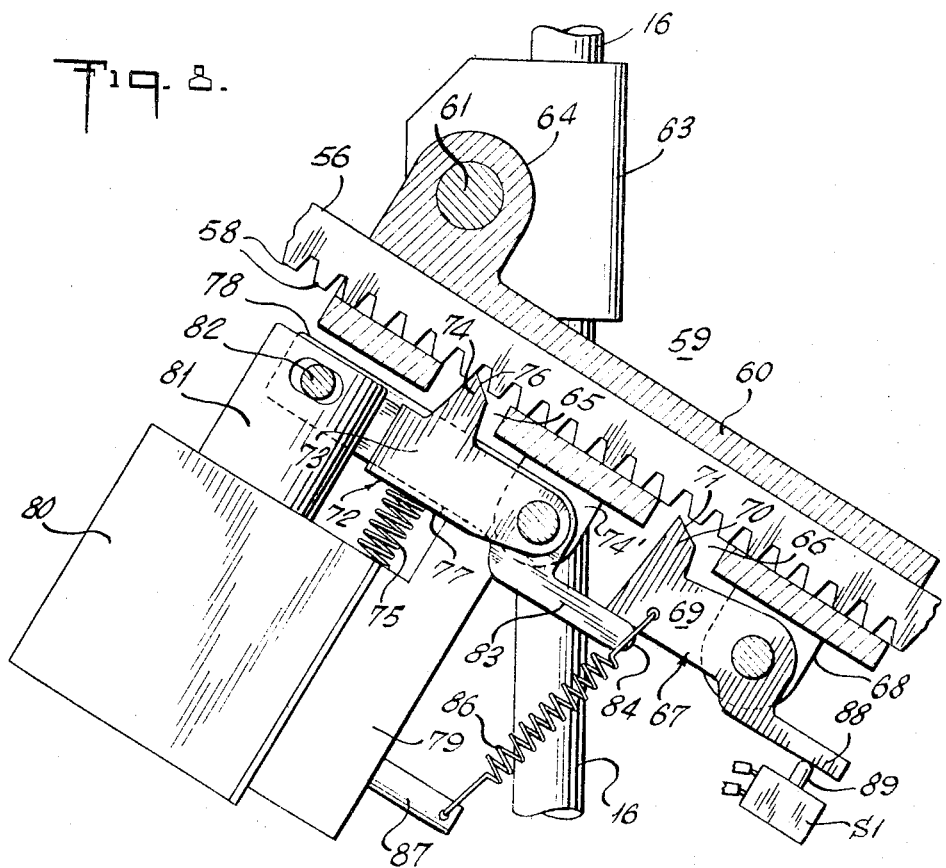
FIGURE 8 is a fragmentary enlarged detailed view of the escapement device as viewed in FIGURE 1.
Figure 9:
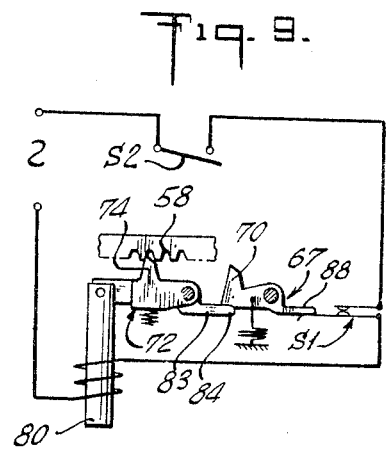
FIGURE 9 is a schematic view of the escapement control circuit.

In a sense, the present invention contemplates the provision of a loading apparatus comprising a receptacle having an opening therein, means for advancing articles to a discharge point, means for supporting said receptacle for swinging about a horizontal axis with said opening adjacent to said discharge point, and means responsive to a force retarding the advance of said articles adjacent to said discharge point to swing said receptacle until said retarding force is substantially relieved. Another feature of the present invention resides in the provision of an orienting device comprising a vertically extending conduit, a sensing element projecting into said conduit adjacent the bottom thereof and an orienting arm located above and movable across said conduit and actuated by said sensing element.

According to a preferred form of the apparatus of the present invention, the article transport means includes a horizontally advancing endless belt at the discharge end of which there is pivotally mounted, for swinging about a transverse horizontal axis, a bracket which removably supports a tote box. The tote box is swingable with the bracket between a top position with its open top vertically disposed and directed rearwardly toward the conveyor and a bottom position with its open top horizontally disposed and upwardly directed and slightly below the conveyor. The bracket is gravity urged to its bottom position and is releasably retained in the upper and intermediate positions by a rack connected between the bracket and a stationary escapement mechanism engaging the bracket. A sensing arm is located at the discharge end of and above the conveyor and is engaged by the bunching of articles at the conveyor discharge end to actuate the sensing arm. An escapement motivating mechanism is actuated by the sensing arm to permit the gravity lowering of the bracket until the sensing arm is released. The orienting device is located along and above the side of the feed end of the conveyor and includes a vertical conduit registering with the side border of the conveyor. A first lever is swingably supported above the conveyor and includes a first arm registering with the conduit and disposed a short distance above the conveyor and an opposite extending second arm. A second lever is pivotally mounted above the first lever and includes an arm normally extending along the side of the conduit and connected by a link to the second arm of the first lever.

Referring now to the drawings which illustrate a preferred embodiment of the present invention, reference numeral 10 generally designates the improved apparatus as applied to the loading of cigars C into tote boxes T and comprises an orienting section 11, a transfer section 12 and a loading section 13.

The transfer section 12 includes a support frame provided with a longitudinally extending vertically arranged plate 14 mounted atop front and rear pairs of vertical legs 16 and 17 respectively. Plate 14 has, integrally formed therewith, a coplanar bracket section 18 directed forwardly from the upper corner of frame plate 14. Projecting transversely from frame plate 14 and suitably journalled thereto are a pair of parallel front and rear drums 19 and 20 which engage and support an endless belt 21 having a horizontal upper run 22. Any suitable means are provided for driving at least one of drums 19 and 20 so as to advance belt 21 along its upper run 22 from orienting section 11 to loading section 13. Spaced above, overlying and parallel to upper run 22 of belt 21 is a guide plate 23 preferably adjustably supported by frame plate 14 and normally disposed above the upper run 21 a distance about equal to or slightly greater than the thickness of cigars C being handled. A flat horizontal bridge plate 24 is supported by frame plate 14 level with upper run 22 of belt 21, and extends from the discharge end thereof to a point shortly beyond the end of plate 14, guide plate 23 projecting to a point just short of the leading end of bridge plate 24.

The orienting section 11 is located forwardly of the feed end of upper run 22 of belt 21, adjacent the trailing end of guide plate 23, and includes a suitably supported vertical conduit 26 of slightly greater transverse cross section than that of cigars C, which conduit is provided at its top with a funnel-shaped chopper 27 communicating with conduit 26 for directing cigars thereto in a vertical orientation. The botom of conduit 26 terminates in a transversely enlarged open bottom chamber 28 delineated primarily by an arcuate front wall 29 extending from the front wall of conduit 26 to the opposite edge of the belt upper run 22 and segment-shaped side walls, chamber 28 having an opening 30 formed therein at the rear thereof with which the cigar upsetting mechanism registers.

Directed rearwardly from a side wall of chamber 28 adjacent the top and bottom of rear opening 30 are top and bottom ears 32 and 33 respectively. A first lever 34 is swingably supported about a longitudinally extending horizontal pin 36 mounted on lower ear 33 and includes a rearwardly upwardly directed arm 37 and an opposite short downwardly and forwardly inclined section 38 joined by a vertical arm 39 to a horizontal forwardly directed leg 40. In normal dormant position, as seen in FIGURES 3 and 4, arm 39 is coplanar with the opening 30 and leg 40 is horizontal and in vertical registry with the conduit 26.

A second lever 41 is swingably supported at its upper end about a longitudinally extending horizontal pin 42 mounted on upper ear 32 and includes a downwardly forwardly inclined arm 43 terminating in a depending vertical leg 44 normally registering with the rear opening 30. The bottom of leg 44 is preferably located above the leg 40 a distance greater than one half the length of cigar C. Levers 34 and 41 are connected by a link 46 formed of stiff wire and terminating at opposite ends in upper and lower fingers 47 and 48 respectively. Upper finger 47 rockably engages the upper lever arm 43 at a point between the ends thereof and the lower finger 48 rotatably engages the free end of the lower lever arm 37. It should be noted that link 46 is so dimensioned and related to levers 34 and 41 and the weights thereof so distributed that in their normal dormant position leg 40 is horizontal and the leg 44 is vertical and in registry with the opening 30.

The loading section 13 comprises a tote box support frame 48 of flat based U-shaped configuration including a bottom plate 49 and front and rear plates 50 and 51 projecting perpendicularly from opposite ends of bottom plate 49. Frame 48 is dimensioned to transversely slidably accommodate a tote box T and is provided along its far side with stop elements to facilitate the proper positioning of the tote box T relative the transfer section 12. A pair of transversely spaced brackets 52 is affixed to the free edge of frame rear plate 51 and rotatably engages a transverse shaft 53 suitably mounted directly below the leading edge of bridge plate 24 thereby permitting the swinging of the frame 48 and tote box T about their trailing upper edges between an upper and rearwardly directed position as illustrated in FIGURE 1 and a lower upright position as illustrated in FIGURE 7.

A lug 54 is affixed to the lower section of rear frame plate 51 and pivotally supports a rearwardly extending rack 56 connected to the lug 54 by a coupling member 57 which is pin-connected to the lug 54. Rack 56 has downwardly directed teeth 58 and is engaged by an electrically controlled escapement device 59 which is mounted on the support leg 16 to permit the automatic regulation of the position of the frame 48 and tote box T attendant the loading thereof.

Escapement device 59 includes a body member 60 which is rockable at its leading upper edge about a transverse horizontal axis delineated by a pin 61 mounted on a collar 63 adjustably affixed to the support leg 16 and engaging a lug 64 directed upwardly from the body member 60. Formed through the upper section of body member 60 is a longitudinally extending track-defining passageway which slidably engages rack 56 and has formed in the bottom wall thereof front and rear access openings 65 and 66 respectively. A first pawl 67 is swingably supported by a trailing bracket 68 depending below the rack passageway and includes a longitudinal arm 69 pivoted at its trailing end to the bracket 68 and terminating in an upwardly directed leg 70 registering with the opening 66. The pawl leg 70 is provided along its free edge with a cam-defining rearwardly downwardly inclined surface 71.

A second pawl 72 includes a longitudinal arm 73 pivoted at its trailing end to a bracket 74' disposed below the rack track between the openings 65 and 66. Directed upwardly from the free end of the arm 73 into registry with the opening 65 is a pawl leg 74 terminating in a downwardly rearwardly inclined upper cam surface 76. A laterally projecting abutment or detent 77 is formed along the lower edge of arm 73. A spring 75 is provided which is entrapped between the underface of arm 73 and a lower stationary abutment normally to urge pawl 72 upwardly. Pawls 67 and 72 are so disposed and the rack 56 so dimensioned that when the upper leading edge of pawl leg 74 registers with the trailing face of a track tooth 58 the upper leading edge of the pawl leg 70 registers substantially with the leading face of a track tooth and the width of the free ends of the teeth 58 is less than the distance between the confronting edges of adjacent teeth.

A rocker arm 78 is pivoted at its trailing end to bracket 74' and has a lower edge engaging the upper face of the pawl detent 77. A support bar 79 depends from body member 60 and has mounted on the side thereof a solenoid 80. Associated with solenoid 80 is a retractable armature 81 provided at its upper end with a coupling pin 82 slidably engaging a longitudinal slot formed at the free end of rocker arm 78. Affixed to and directed rearwardly from the lower edge of the rocker arm 78 is an arm 83 terminating in a laterally extending leg 84 which engages the underface of the free end of the pawl arm 69. A helical tension spring 86 is connected between the free end of pawl 67 and a rod 87 projecting from support bar 79, thereby normally to urge pawl 67 downwardly against and as limited by the abutment leg 84. Projecting rearwardly from the trailing lower edge of pawl 67 is an arm 88 having a free end bearing on the actuating plunger 89 of a suitably supported normally closed first switch S1 which is opened upon depression of the plunger 89.

A longitudinally extending horizontal sensing arm 90 is provided at its leading end with a vertical ear 91 and is swingably connected to the leading lower corner of the plate 18 by a pin 92 engaging ear 91. Arm 90 includes at its trailing end an upwardly rearwardly inclined section 94 terminating in a rearwardly directed leg 96 extending into overlying position relative to the leading end of guide plate 23. In the normal depressed position of arm 90 leg 96 rests on plate 23 and is spaced above the confronting wall of the fully raised tote box T a distance substantially equal to and preferably slightly greater than the thickness of cigars C. Moreover, the spacing between the depressed inclined section 94 and the leading edge of the bridge plate 24 is likewise slightly greater than the cigar thickness to afford, normally, free passage of cigars C.

Mounted on the trailing upper corner of plate 18 by means of a bracket 97 is a normally open second switch S2 having a depending actuating plunger 98 engaging the upper face of leg 96 whereby raising of arm 90 effects closing of switch S2. Solenoid 80 and switches S1 and S2 are connected in series to a source of solenoid energizing current. A switch is disposed in the path of rear frame wall 51 and engaged and actuated thereby upon frame 48 reaching or closely approaching its lower position, as illustrated in FIGURE 7, to open the circuit to solenoid 80 and de-energize the drive of belt 21 in any well known manner while frame 48 is in said depressed position.

Considering now the operation of the apparatus described above, a tote box T with its top opening facing upwardly is nested in the frame 48 while the latter is in its depressed position. The frame 48 and tote box T are then swung upwardly about the shaft 24 to their top positions as illustrated in FIGURE 1. Rack 56 is pulled forwardly by the swinging of frame 48 about its pivot at 53, rack teeth 58 bearing against the forwardly, upwardly inclined cam surfaces 71 and 76 thereby to depress pawls 67 and 72. When frame 48 has reached its topmost position the circuits are completed to advance the belt 21 and ready the circuit of the solenoid 80.

Cigars C are successively dropped into hopper 27 and fall down conduit 26 in vertical positions. As a cigar C drops onto actuating leg 40 it depresses said leg to swing lever 34 counterclockwise as seen in FIGURE 5. Swinging lever 34, by way of link 46, in turn swings arm 44 forwardly from its vertical position to strike against the upper part of the waiting cigar C and swing the cigar about its base from a vertical to a transverse horizontal position in which position it is deposited on the advancing upper run 22 of belt 21. Belt 22 transports cigars C to bridge plate 24 and successive cigars C advanced by belt 21 push cigars C across bridge plate 24 in side-by-side relationship and into tote box T along the end wall thereof.

As the leading cigar C reaches the bottom wall of the tote box T, the further advance of the cigars is impeded and the cigar along the leading edge of the bridge plate 24 is urged by the trailing cigars C and rides upwardly over the next leading cigar C to bear upon the underface of the sensing section 94 and raise the arm 90. The same result will follow if the cigars beneath arm 90 bunch together and any thereof is raised upwardly of the box wall. With the raising of arm 90 leg 96 actuates plunger 98 to close switch S2. The closing of the switch S2 completes the circuit to and energizes the solenoid 80 to retract plunger 81 and thereby retract lever 78 and pawl 72 and to raise the pawl 72 by means of the swinging upwardly of leg 84. The depressed pawl 72 releases rack 56 to permit the advance of rack 56 and slight downward movement of frame 48 and tote box T about pivot 53. The raised pawl 67 registers with an intertooth space to limit the advance of the rack a fraction of in increment. The raising of pawl 67 effects the opening of the switch S1 to open the circuit to and de-energize solenoid 80 so that plunger 81, lever 78 and pawls 67 and 72 return to their initial position, the rack having advanced a full increment defined by the distance between a successive pair of teeth 58. The above cycle is repeated as long as the switch S2 is kept closed by the raised arm 90. However, when the tote box T has dropped sufficiently to permit the introduction of additional cigars C, the cigars advance and arm 90 drops to effect the opening of switch S2 and the locking of the frame 48 and tote box T in its partially lowered position until the introduction of cigars C is again impeded as aforesaid to raise the arm 90 and close the switch S2 to repeat the frame and tote box lowering sequence described above. The above procedure is continued until the tote box T is filled and the frame 48 reaches its bottom position to deactuate the apparatus as aforesaid. The filled tote box T is then replaced by an empty tote box and the above operation repeated.

While there has been described and illustrated a preferred embodiment of the present invention, it is apparent that numerous alterations, omissions and additions may be made without departing from the spirit thereof.

What is claimed is:

1. A loading apparatus comprising an endless conveyor belt having a longitudinal upper horizontal advancing run terminating in a leadng discharge point for transporting articles along a predetermined path to said discharge point, a bracket swingable about a horizontal transverse axis adjacent said discharge point between a raised and a lowered position and normally urged toward said toward said lowered position, means on said bracket for releasably engaging an open-topped receptacle, means for sensing the raising of said articles to a level above that of said predetermined path, means for releasably locking said bracket above said lowered position, and means responsive to said sensing means for releasing said locking means to effect said lowering of said bracket until said articles fall below said level.

2. A loading apparatus comprising an endless conveyor belt having a longitudinal upper horizontal advancing run terminating in a leading discharge point for transporting articles along a predetermined path to said discharge point, a bracket swingable about a horizontal transverse axis adjacent to said discharge point between a raised and a lowered position and gravity urged toward said lowered position, a longitudinally extending rack connected to said bracket, a rockable escapement engaging and releasably locking said rack, means on said bracket for releasably engaging an open-topped receptacle, means for sensing the raising of said articles to a level above that of said predetermined path, and means responsive to said sensing means for rocking said escapement and permitting the advance movement of said rack and the lowering of said bracket until said articles fall below said level.

3. The loading apparatus of claim 2, wherein said escapement includes a lever pivotally supported between the ends thereof and pawl elements oppositely disposed relative to and releasably engageable by said lever and engaging said rack to permit the free return movement of said rack.

4. The loading apparatus of claim 2, wherein said sensing means comprises a normally open first switch and said escapement rocking means comprises a normally closed second switch and a solenoid including an armature connected to said escapement, and means for connecting said solenoid and first and second switches in series to a source of current.

5. The loading apparatus of claim 2, including means for depositing elongated articles on said conveyor belt oriented in a direction transverse to said conveyor belt.

References Cited by the Examiner

UNITED STATES PATENTS

| | | | |
|---|---|---|---|
| 2,354,040 | 7/1944 | Molins et al. | 53—64 |
| 2,592,642 | 4/1952 | Bardet | 53—162 X |
| 2,896,384 | 7/1959 | Carlsen et al. | 53—245 X |
| 3,011,613 | 12/1961 | Vilmerding | 193—43 |
| 3,097,460 | 7/1963 | O'Brien | 53—64 |
| 3,126,993 | 3/1964 | Vander Schoot | 193—43 |

TRAVIS S. McGEHEE, *Primary Examiner.*